Patented May 10, 1927.

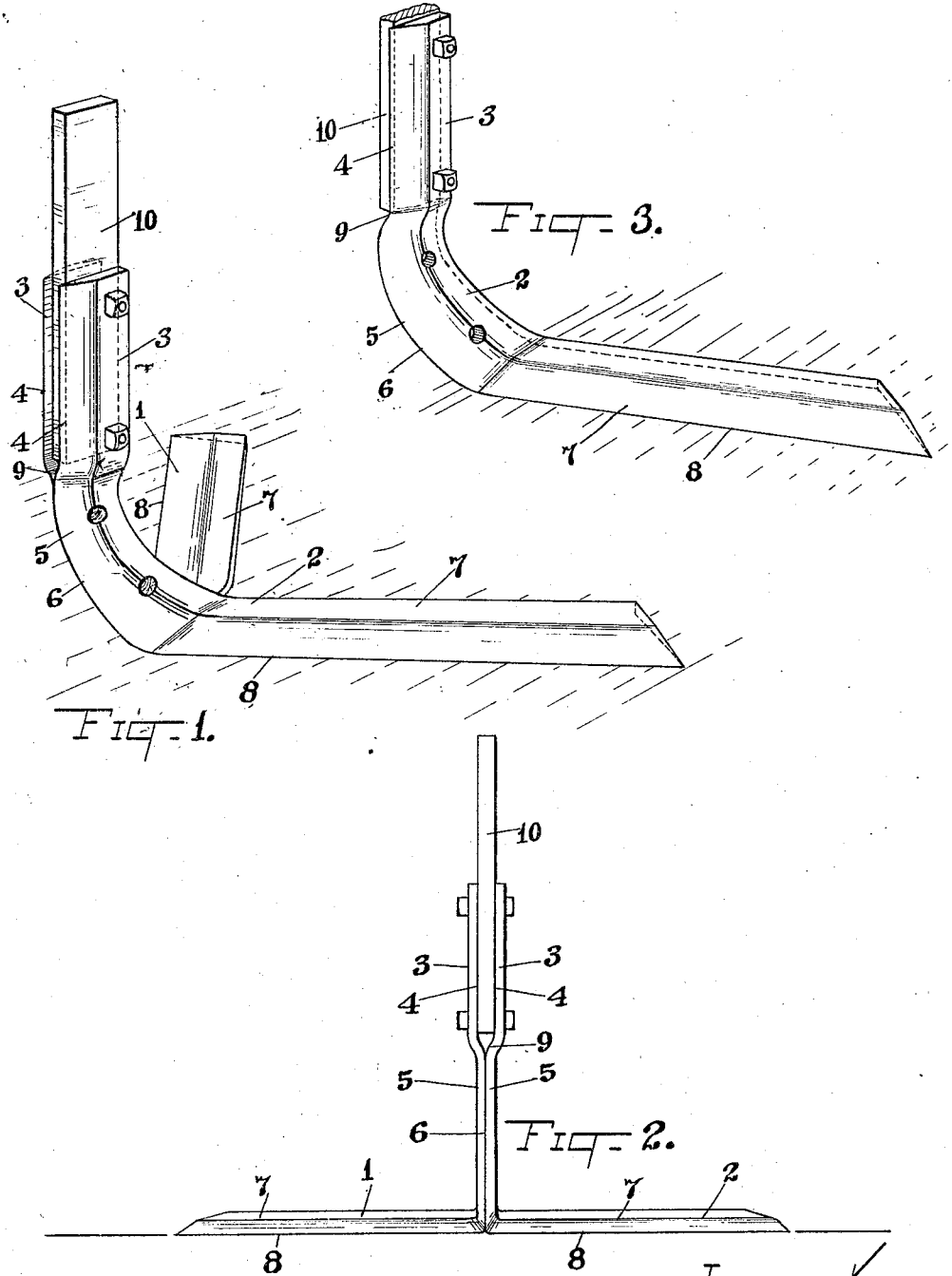

1,628,422

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

WEED-CUTTING DEVICE.

Application filed July 9, 1923. Serial No. 650,317.

My invention relates to weed cutting devices adapted for attachment to cultivators and similar machines, and my object is to provide a device of this character constructed of weed cutting units secured together or capable of being separated to be operated independently, each unit having a horizontal and vertical cutting edge by which weeds and the roots thereof can be severed and destroyed.

Referring to the drawings in which similar numerals indicate identical parts—

Figure 1 is a perspective view of my device. Figure 2 is a front view of Figure 1, and Figure 3 is a perspective view of one of the units as mounted for independent operation.

As illustrated in the drawings, my device is composed of cutting units 1 and 2 adapted to be connected together for combined operation, as shown in Figure 1, or used separately as may be desired, each unit consisting of a vertical part 3, having a cutting edge 4, and a rearwardly extending and preferably curved part 5 which is provided with a cutting edge 6; from the lower end of the part 5, and at a rearward angle thereto extends a blade or sweep 7 with a cutting edge 8. The vertical part 3 of each unit is offset at 9 from the part 5 so that when the units are brought together, for combined operation, space is provided between the parts 5 for reception of a standard 10 to which the units are bolted, and from which they project forwardly, presenting a cutting edge on both sides of the standard 10 to their juncture at 9.

Each unit is complete in itself, the parts thereof are integral and the cutting edges are continuous. When the units are assembled for combined operation, as shown in Figure 1, the blades 7 are bent sharply at an angle to the parts 5 so that the blades 7 present a continuous cutting edge, and the cutting edges 4 of the parts 3 when brought together present a single effective cutting edge which may be either curved or straight. In this instance, however, from the offset 9, the cutting edge formed by the joined parts 5 is curved downwardly and rearwardly to the parts 7.

The construction of my device is extremely simple and economical and remarkably effective in operation for the vertical and horizontal cutting edges are continuous one with the other and, consequently, weeds and vines and the roots thereof are completely severed, and no surface is presented on the device to which weeds can cling.

What I claim is—

1. In a weed cutter of the type described, the combination with a support, of dual units having vertical and horizontal parts with forward cutting edges, said vertical parts secured together and to said support and presenting a single cutting edge extending downwardly and rearwardly from said support to the horizontal parts.

2. In a weed cutter of the type described, the combination with a support, of dual units having vertical and horizontal parts with forward cutting edges, said vertical parts mounted on opposite sides of the support and secured together below said support to present a single cutting edge curving downwardly and rearwardly to the horizontal parts.

3. In a weed cutter of the type described, the combination with a support, of dual units having vertical and horizontal parts with forward cutting edges, said vertical parts mounted on opposite sides of the support with their cutting edges projecting forwardly therefrom, and means securing said vertical parts together below the support to present a single cutting edge curved downwardly and rearwardly to the horizontal parts.

4. In a weed cutter of the type described, the combination with a support, of dual units having vertical and horizontal parts with forward cutting edges, said vertical parts mounted on opposite sides of the support with their cutting edges projecting forwardly therefrom and brought together beneath said support to present a single cutting edge curved downwardly and rearwardly to the cutting edges of the horizontal parts.

WILLIAM L. PAUL.